(12) United States Patent
Stein

(10) Patent No.: US 6,658,871 B1
(45) Date of Patent: *Dec. 9, 2003

(54) ELECTRONIC EVAPORATOR DRYER FOR ELIMINATING ODORS IN VEHICLE AIR CONDITIONING SYSTEMS

(75) Inventor: Myron Stein, Leguna Niguel, CA (US)

(73) Assignee: AirSept, Inc., Marietta, GA (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/091,839

(22) Filed: Mar. 5, 2002

Related U.S. Application Data
(60) Provisional application No. 60/285,935, filed on Apr. 23, 2001.

(51) Int. Cl.[7] .............................................. F25D 21/00
(52) U.S. Cl. ............................. 62/150; 62/133; 62/158; 62/182; 62/282; 62/244
(58) Field of Search .......................... 62/133, 150, 158, 62/182, 282, 244, 82

(56) References Cited

U.S. PATENT DOCUMENTS

| | | | | |
|---|---|---|---|---|
| 3,595,029 A | * | 7/1971 | Lende | 62/244 |
| 5,046,327 A | * | 9/1991 | Walker et al. | 62/244 |
| 5,218,836 A | * | 6/1993 | Jarosch | 62/227 |
| 5,386,823 A | * | 2/1995 | Chen | 128/204.15 |
| 5,669,231 A | * | 9/1997 | Itoh et al. | 62/210 |
| 5,899,082 A | * | 5/1999 | Stein et al. | 62/133 |
| 6,116,037 A | * | 9/2000 | Burnett | 62/239 |

* cited by examiner

Primary Examiner—William C. Doerrler
Assistant Examiner—Mark Shulman
(74) Attorney, Agent, or Firm—Womble Carlyle Sandridge & Rice, PLLC

(57) ABSTRACT

An apparatus and method for drying condensate from the heat exchanger of a vehicle's air conditioning system after operation in order to thwart odor buildup is provided. The apparatus and method operate regardless of whether the system's blower control circuit is positively or negatively switched. The apparatus includes relays that bypass the normal operating electrical routing to the air conditioning system's blower motor to operate the blower directly. The method comprises determining that the engine of the vehicle has been switched off and that the air conditioning system of the vehicle was in operation prior to the engine being switched off. If the conditions are met, the air conditioning system's blower is operated on a predetermined time schedule to circulate air in the air conditioning system to dry condensate therefrom. In this way, growth of odor-causing fungus and bacteria is inhibited.

37 Claims, 5 Drawing Sheets

ELECTRONIC EVAPORATOR DRYER FOR ELIMINATING ODORS IN VEHICLE AIR CONDITIONING SYSTEMS

This application claims priority to U.S. provisional patent application, U.S. Ser. No. 60/285,935, filed Apr. 23, 2001, and incorporates in its entirety this provisional patent application as if fully set forth herein.

TECHNICAL FIELD

The invention disclosed herein relates generally to automotive air conditioning systems and more particularly to the prevention of moisture build-up within such air conditioning systems with the goal of eliminating the promulgation of fungus and bacteria and the odor that results therefrom.

INCORPORATION OF PRE-EXISTING PATENT DISCLOSURE

This disclosure incorporates in its entirety the disclosure, claims, and drawings of U.S. Pat. No. 5,899,082 issued May 4, 1999 and filed on Sep. 18, 1997 as if fully set forth herein. This patent will be referred to herein as the "incorporated reference."

BACKGROUND

As discussed in detail in the incorporated disclosure, automotive air conditioning systems are provided in most vehicles to cool the passenger compartment of the vehicle during hot weather. In general, automotive air conditioning systems comprise a compressor coupled to the engine that compresses a refrigerant to its liquid state. The compressed liquid refrigerant is then delivered to a heat exchanger known as an evaporator within the ductwork of the air conditioning system, where it is allowed to expand and thereby cools the evaporator. A blower forces air across the evaporator and into the passenger compartment of the vehicle. As the air passes through the evaporator, it is cooled and the latent heat that was contained in the air is transferred to the refrigerant within the evaporator. Thus, the passenger compartment receives cool air. The heated refrigerant is then passed through a radiator where it is cooled and delivered back to the compressor where the cycle begins anew.

As warm air from the passenger compartment is blown through the evaporator of an automobile air conditioning system to be cooled, water vapor contained in the air condenses on the surfaces of the evaporator and on surrounding surfaces. During normal operation of the vehicle, the water that condenses on the evaporator simply runs to the bottom of the evaporator and is drained from the air conditioning system onto the roadway. However, when the vehicle's engine is shut off and the air conditioning is no longer in operation, the condensed water on the evaporator begins to evaporate slowly within the ductwork of the air conditioning system and, as a result, a damp dank atmosphere is created. Such an atmosphere is ideal for the growth of mold, mildew, fungus, and bacteria within the ductwork of the system and particularly on the moist and wet surfaces of the evaporator. The growth of such organisms, in turn, results in a stale and unpleasant odor within the passenger compartment itself and can lead to air-borne spores and other organisms that are unhealthy for the occupants of the vehicle.

In the past, there have been attempts to address the problems of microorganism build-up within automotive air conditioning systems. For example, disinfectants and/or deodorizers may be sprayed into the air conditioning system to coat the surfaces thereof to prevent the growth of mold, mildew, and other fungus and bacteria within the ductwork. While this approach can prevent the build-up of odor causing organisms or mask their odors, at least in the short term, it still does not address the fundamental cause of such build-up, i.e., the moist, damp atmosphere within the air conditioning system.

The invention disclosed and claimed in the incorporated reference approaches the problem by preventing the establishment of a moist atmosphere within the air conditioning system that is conducive to the growth of unwanted microorganisms. In general, this invention comprises a method of drying the interior and evaporator of a vehicle's air conditioning system to thwart the propagation of fungus and bacteria and its attendant odor. The method comprises the steps of determining that the engine of the vehicle has been switched off, determining that the air conditioning system was in operation prior to the engine being switched off, and, upon determining that both of these conditions exist, operating the blower of the vehicle's air conditioning system on a predetermined time schedule to draw air through the system for drying condensate from interior surfaces thereof. To carry out this methodology, the incorporated reference discloses an electronic control circuit coupled to the blower motor of the vehicle air conditioning system. When the circuit senses that the engine has been shut off after air conditioning operation, it activates a relay on a predetermined time schedule, such as once every ten minutes, for a predetermined period of time. The intermittent scheduled operation of the blower draws out and removes evaporated condensate from within the air conditioning system and, at the end of several cycles, all of the condensate has been dried and removed. Thus, the fundamental cause of the growth of undesirable microorganisms, i.e., the moist, damp atmosphere within the air conditioning system, is eliminated and such organisms do not tend to grow in the resulting dry atmosphere.

Operation of a vehicle's air conditioning blower motor on a predetermined time schedule after operation of the air conditioning system as disclosed in the incorporated reference has proven to be a successful solution to the problems of micro-organism growth and its attendant odor in vehicles. However, the Electronic Evaporator Dryer (EED) circuitry taught in the incorporated reference for carrying out the methodology, while very successful for use within some automotive blower wiring schemes, nevertheless is not useable with certain other wiring schemes found in the automotive industry. More particularly, the relay of the EED circuitry in the incorporated reference is spliced into the blower motor circuit downstream of positively switched blower control circuits of the system. The other terminal of the blower motor is connected directly to ground in these "positively switched" systems. During the drying operation, the relay of the EED circuit is activated to disconnect the positive terminal of the blower motor from the blower control circuitry and to connect it to directly to the positive terminal of the vehicle's battery. Thus, when the relay is activated, the blower motor is operated at maximum speed to dry interior surfaces of the air conditioning system. Operation of the blower at its maximum speed is highly desirable to achieve the best and quickest drying.

While the foregoing EED circuitry works well for systems wherein the blower motor is positively switched, i.e. switched and controlled on the positive side of the motor, it does not operate well in systems where the blower control circuitry of the air conditioning system is "negatively switched" or, in other words, switched to ground. In such a negatively switched system, the positive terminal of the blower motor normally is connected directly to the accessory switch of the vehicle and the negative terminal of the blower motor is connected to ground through the blower control circuit. The blower control circuit includes a blower switch for turning the blower on and off and an array of resistors for controlling the speed of the blower motor as it runs during normal operation of the vehicle.

Thus, during the drying operation, if the positive terminal of the blower only is connected through the EED relay to the positive terminal of the battery, the blower motor in most cases will not operate at maximum speed because the negative terminal of the blower is connected to ground through the speed control resistor network of the blower control. In some cases where a driver has turned the blower to the "off" position in a negatively switched scheme, the blower, using the EED circuit of the incorporated reference, will not operate at all during the evaporator drying cycle. Thus, there is a need for an improved EED control circuit for carrying out the methodology that is applicable to and works with blower motor wiring and control schemes wherein the blower motor is positively switched and controlled and also works with wiring schemes wherein the blower motor is negatively switched and controlled. It is to the provision of such a circuit and the methodology carried out by the circuit that the present invention is primarily directed.

SUMMARY

Briefly described, the present invention comprises an apparatus and method for eliminating odors arising from the growth of organisms within a vehicle's air conditioning system.

In one embodiment, the present invention encompasses an apparatus for use with a vehicle's air conditioning system. The apparatus generally includes a first relay connected to a positive terminal of a blower motor of the vehicle's air conditioning system, and a second relay connected to a negative terminal of said blower motor. These relays are coupled to a logic circuit that cooperates with them to bypass both the air conditioning system's blower control and the vehicle's accessory switch to connect the blower motor terminals to the positive terminal of the battery and also to ground.

Another embodiment includes a vehicle air conditioning system. The air conditioning system generally includes a compressor through which refrigerant flows to an evaporator. A blower cooperates with the evaporator to cool the refrigerant. The blower includes a blower control and a blower motor having a positive terminal and a negative terminal. The air conditioning system also includes a bypass circuit that bypasses both the blower control and the accessory switch to connect the blower motor terminals directly to the positive terminal of a battery and to ground, to operate the blower during the drying cycles. For example, the bypass circuit may include a logic circuit connected to a temperature sensor and/or a battery voltage sensor. When the appropriate conditions are noted by these sensors, the logic circuit can activate the control circuit to connect the blower terminals to the battery and ground to activate the blower at its maximum speed.

In another embodiment, an apparatus for use with a vehicle air conditioning system to dry condensate from the heat exchanger of the system to prevent propagation of fungus and bacteria and resulting odors is provided. The apparatus includes a logic circuit connected to both a battery voltage sensor and a temperature sensor. The logic circuit also is operatively coupled to a first relay that selectively switches the positive terminal of the blower motor of the air conditioning system to the positive terminal of the vehicle's battery. A second relay is also connected to the logic circuit. This second relay is selectively switches the negative terminal of the blower motor to ground.

Among the general aspects of the present invention is a method of drying condensate from the heat exchanger of a vehicle's air conditioning system to thwart the propagation of fungus and bacteria and its attendant odor. The method includes the step of determining that the engine has been switched off, as well as sensing the ambient temperature and determining that the air conditioning system of the vehicle was in operation prior to the engine being switched off if the sensed ambient temperature is greater than a predetermined threshold. The method also includes operating the blower of the vehicle's air conditioning system on a predetermined time schedule to draw air through the air conditioning system for drying condensate from interior surfaces thereof, wherein operating the blower includes bypassing the blower control circuit.

These and other features, objects, and advantages of the invention will become more apparent upon review of the detailed description set forth below when taken in conjunction with the accompanying drawing figures, which are briefly described as follows.

DETAILED DESCRIPTION

Figure 1:
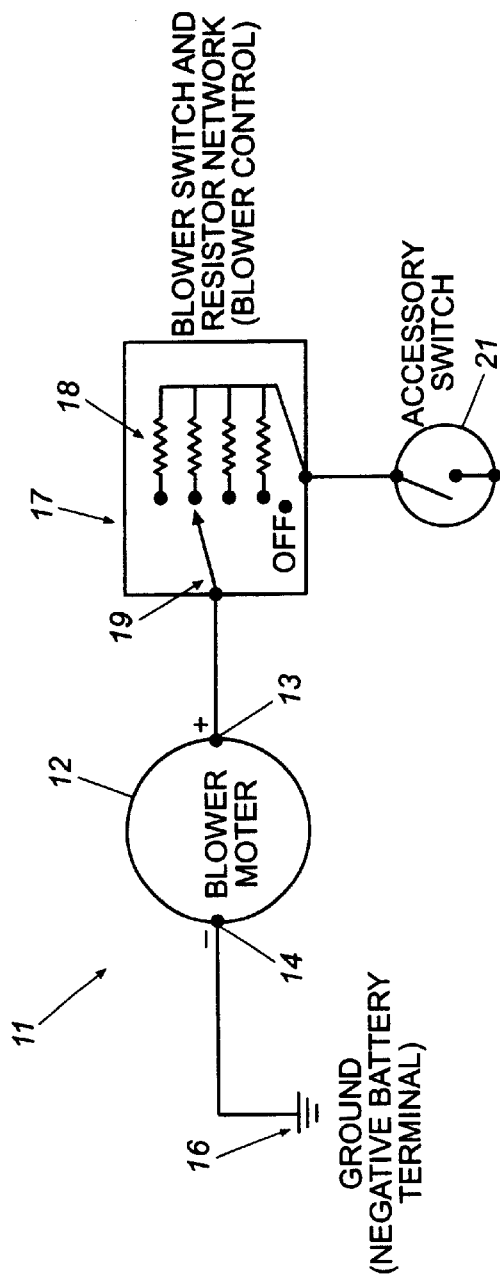
FIG. 1 is a simplified illustration of a first type of wiring scheme found in vehicle air conditioning systems wherein the blower motor is positively switched and controlled by a blower control circuit.
Figure 2:
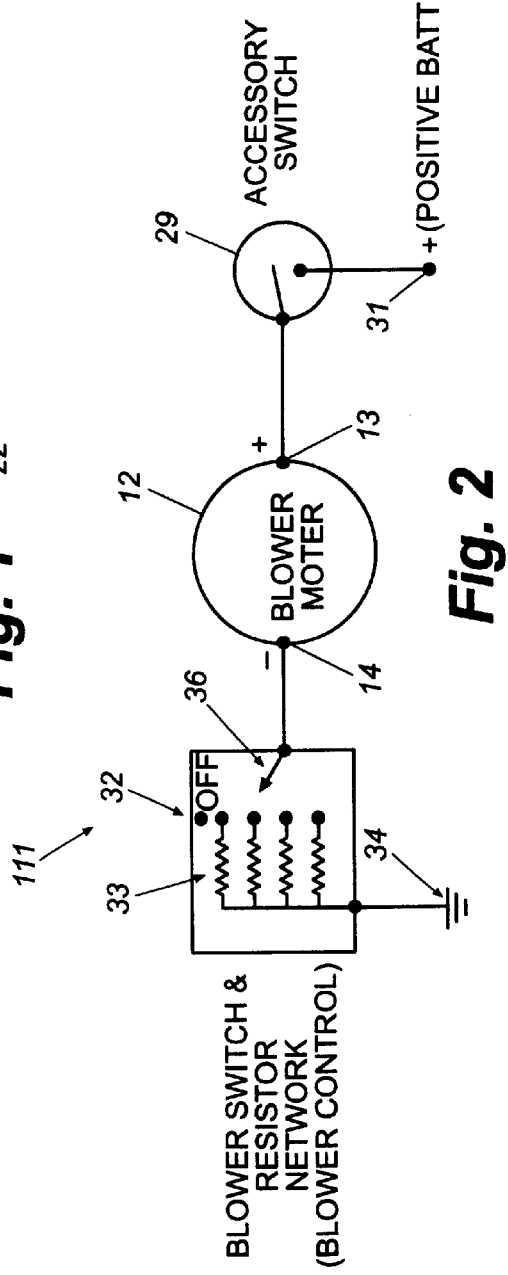
FIG. 2 is a simplified illustration of a second blower motor wiring scheme wherein the blower motor is negatively switched and controlled by a blower control.

Referring now in more detail to the drawings, in which like numerals refer to like parts throughout the several views, FIGS. 1 and 2 are presented to illustrate two common types of wiring and blower control schemes 11 and 111 used in vehicles for controlling the blower motor of the vehicle's air conditioning system. FIG. 1 illustrates a "positively switched" blower motor control system 11 and FIG. 2 illustrates a "negatively switched" blower motor control system 111. Referring to FIG. 1, a blower motor 12 of an automotive air conditioning system has a positive terminal 13 and a negative terminal 14. The negative terminal 14 is connected directly to ground 16. The positive terminal 13 is connected to the positive battery terminal 22 through a blower switch and resistor network 17 (or blower control circuit) and through the accessory or key switch 21 inside the automobile. The blower control circuit 17 includes an array of resistors 18 and a manually operated control knob 19 within the vehicle. The control knob 19 can be rotated or otherwise manipulated to connect the blower motor 12 through any one of the resistors to the positive terminal 22 of the battery or to turn off the blower motor. The resistances of resistors in the network 18 are selected such that the blower motor 12 can be operated at a variety of speeds depending upon the position of the control knob 19. It thus will be seen that in this wiring scheme, the speed of the blower motor 12 is controlled by switching one of the resistors in the network 18 in series with the positive side of the circuit, thus the designation "positively switched."

Referring to FIG. 2, which illustrates a negatively switched blower control scheme 111, the blower motor 12 again has positive terminal 13 and a negative terminal 14. The positive terminal 13 is connected to the positive battery terminal 31 through the accessory or key switch 29 within the vehicle. The negative terminal 14 of the blower motor 12 is connected to ground 34 through a blower switch and resistor network (or blower control circuit) 32 having a speed control resistor network 33, as discussed above. With such a negatively switched wiring scheme 111, the positive terminal 13 of the blower motor 12 is always connected directly to the positive terminal 31 of the battery during operation of the vehicle. The blower motor speed is controlled (or the blower motor is shut completely off) by manipulating the control knob 36 to select a particular resistor and place it in series with the negative terminal 14 of the blower motor 12. Thus, the designation "negatively switched."

Figure 3:
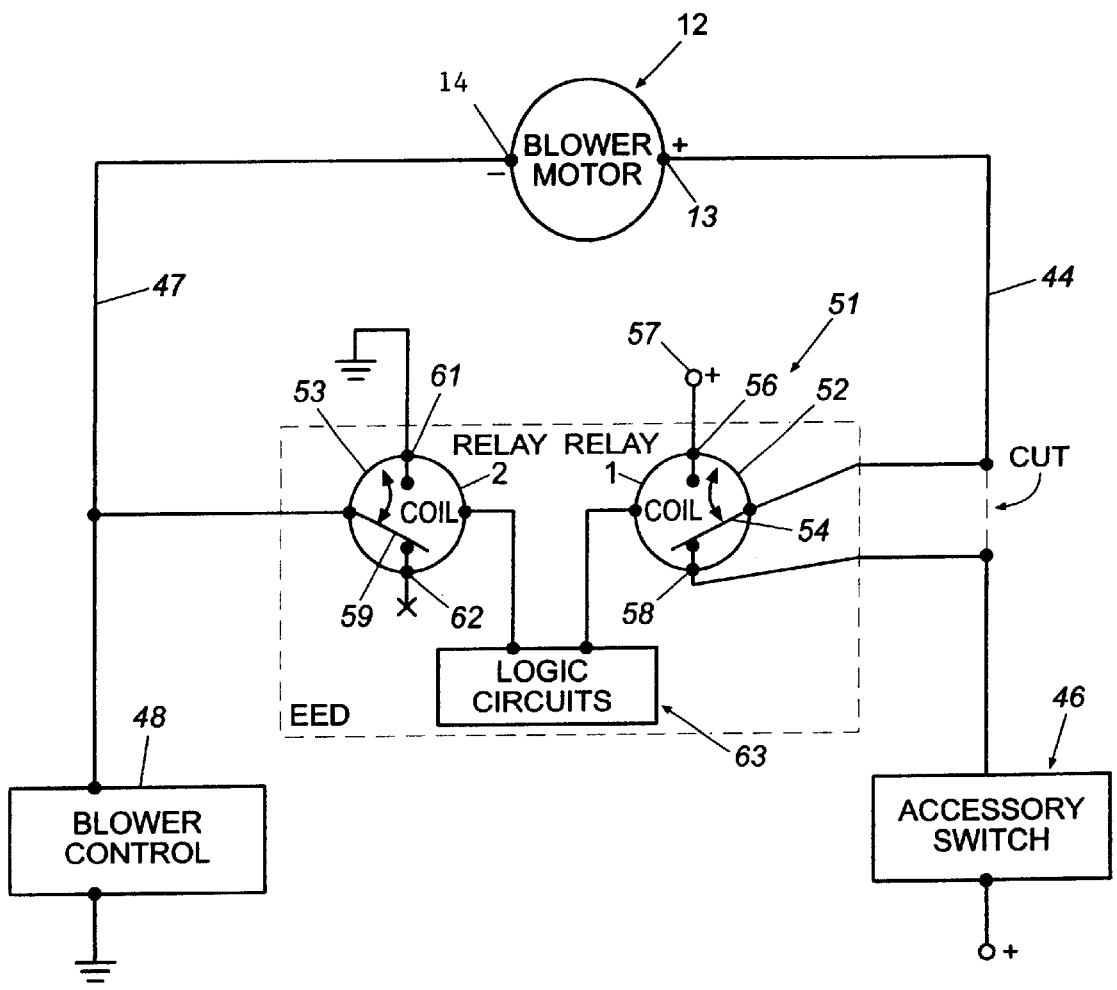
FIG. 3 is a functional diagrammatic illustration of an EED circuit according to the present invention showing the connections to a negatively switched blower motor of a vehicle for carrying out the invention.
Figure 4:
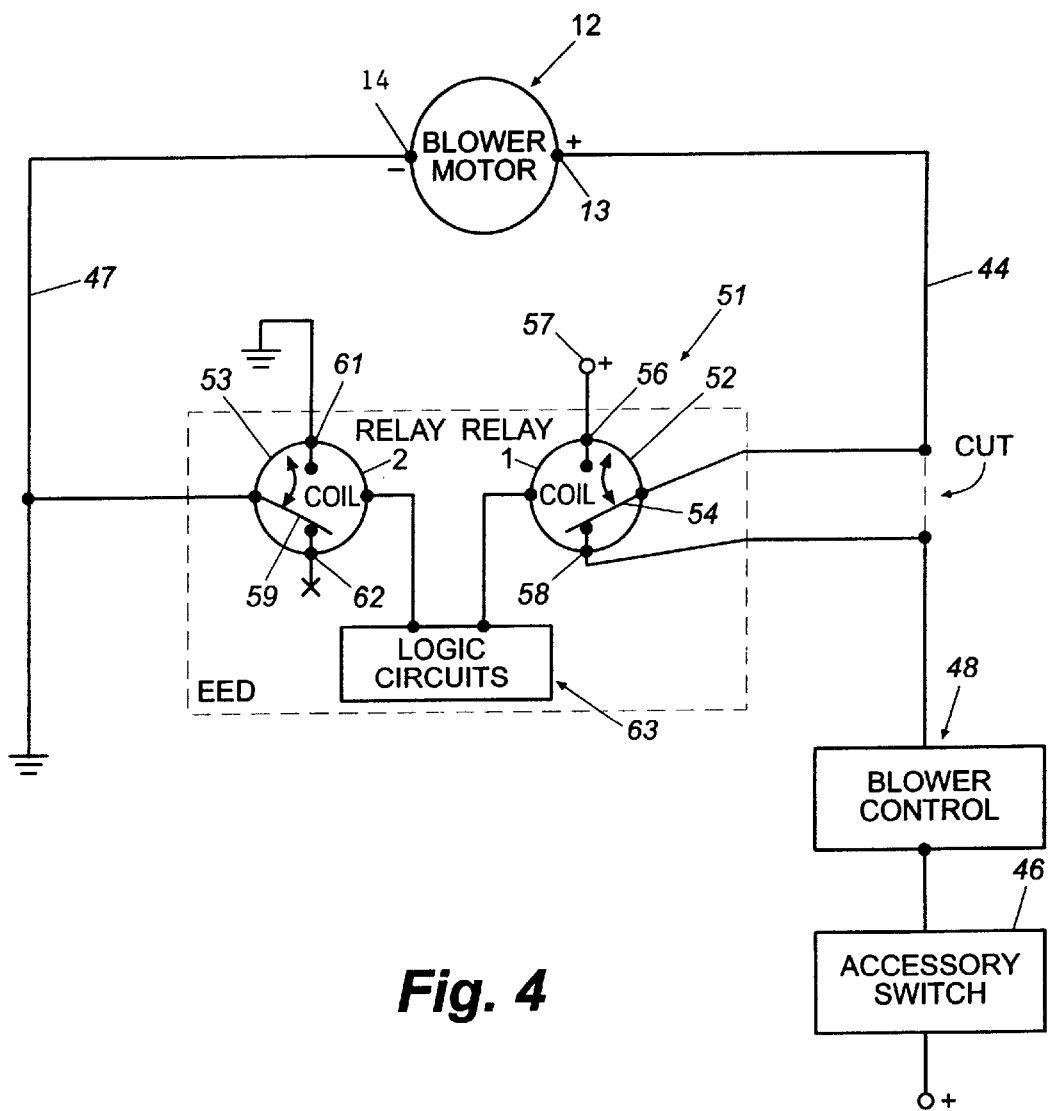
FIG. 4 is another functional diagrammatic illustration of an EED circuit according to the present invention showing connection to a positively switched blower motor of a vehicle for carrying out the invention.

FIGS. 3 and 4 illustrate in simplified black box form an EED circuit according to the invention coupled to blower motor control systems for carrying out methods of the invention. In FIG. 3, the blower motor control system is illustrated as being one alterative employing a negatively switched wiring scheme similar to that of FIG. 2, whereas FIG. 4 illustrates a positively switched wiring scheme similar to that of FIG. 1. For this purpose, Box 46 is indicated as being the accessory switch, whereas Box 48 is the blower control circuit. In FIG. 3, the blower control 48 connects the negative terminal 14 of the blower motor 12 to ground, whereas in FIG. 4 the blower control 48 connects the positive terminal 13 of blower motor 12 to the positive terminal of the vehicle's battery through the accessory switch 46. The EED unit 51 of the present invention works equally well with either wiring scheme.

The EED unit includes a first relay 52 and a second relay 53. The coils of each relay are connected to and activated by the logic circuits 63 of the unit, which are described in more detail below. The first relay 52 is a single-pole double-throw type relay having a battery pole 56, an accessory switch pole 58, and a common or switch pole 54. The switch pole 54 is connected to the accessory switch pole 58 when the relay is in its inactivated state and to the battery pole 56 when the relay is activated. Accessory switch pole 58 is said to be "normally closed" and battery pole 56 is "normally open."

The first relay 52 is spliced in series with the wire 44 that connects the positive terminal of the battery to the positive terminal 13 of the blower motor 12 through the accessory switch 46 and, possibly, blower control 48, depending upon whether blower control 48 is connected to accessory switch 46 or to ground. Wire 44 is cut and connected to the switch pole 54 and accessory switch pole 58. Since accessory switch pole 58 is normally closed, wire 44 connects the positive terminal 13 of blower motor 12 to the positive terminal of the battery through the accessory switch 46, possibly blower control 48, and first relay 52 under normal operating conditions.

A second relay 53, which also may be a single-pole double-throw relay, has an unconnected pole 62, which is normally closed, a ground pole 61, which is normally open and a second switch pole 59, which switches between the first two poles. The switch pole 59 of the relay 53 is electrically connected to the wire 47 that connects the negative terminal 14 of the blower motor 12 to ground, possibly through the blower control 48, depending upon the wiring scheme. Under normal operating conditions, the second relay 53 is in its inactive state, wherein second switch pole 59 is switched to unconnected switch pole 62. When the second relay 53 is activated, switch pole 59 switches to ground pole 61 so that the normal connection between the negative terminal 14 to ground is bypassed. Thus, if blower control 48 is connected to ground, as shown in FIG. 3, the blower control 48 is bypassed when the second relay 53 is activated.

The logic circuits 63 within the EED module 51 are configured and programmed to activate the first and second relays 52 and 53 under predetermined conditions. More specifically, and as described in more detail in the incorporated reference and below, the logic circuits include a temperature sensor and a battery voltage sensor. The battery voltage sensor is monitored to determine when the engine of the vehicle has been shut off and the temperature sensor is monitored to determine when the ambient temperature is above a predetermined threshold, such as, for example, 60° F. When these sensors indicate that the engine has been shut off and that the temperature is above the threshold, a presumption is made that the air conditioning system of the vehicle has been in operation. At this point, the logic circuit activates both the relay 52 and the relay 53 simultaneously, then deactivates, and again activates them repeatedly in a predetermined timing schedule. In other words, the relays are activated for a predetermined time, deactivated for a predetermined time, again activated for a predetermined time, and so on through a pre-established number of cycles.

Each time the relays 52 and 53 are activated as described above, the following occurs. First, the positive terminal 13 of the blower motor is disconnected from the accessory switch and possibly the blower control, depending upon the wiring scheme in use, as the switch pole 54 of the relay moves into contact with the battery pole 56. When the switch pole 54 engages the battery pole 56, which is connected directly to the positive terminal 57 of the battery, the positive terminal 13 of the blower motor 12 becomes directly connected to the positive terminal 57 of the battery through the relay 52. At the same time, the switch pole 59 of the second relay 53 moves to engage the ground pole 61 of the relay. When this occurs, the wire 47 normally connecting the negative terminal 14 of the blower motor 12 to ground, and possibly the blower control 48, depending upon the wiring scheme, is shunted directly to ground through ground pole 61 of second relay 53.

Accordingly, it will be seen that when the relays 52 and 53 are each activated, the positive terminal 13 of the blower motor becomes connected directly to the positive terminal of the battery and the negative terminal of the blower motor becomes connected directly to ground. As a result, the blower motor is operated at its full speed as long as the relays 52 and 53 are each activated. This result ensues regardless of whether the wiring scheme in use in the particular vehicle is a positively switched wiring scheme as in FIG. 1 or a negatively switched wiring scheme as in FIG. 2. This is because all of the blower control circuitry, whether it is on the positive or negative side of the blower motor, is bypassed and the blower motor is connected, regardless of the wiring scheme, directly to the positive terminal of the battery and to ground. Thus, the EED circuit of the present invention, unlike that of the incorporated reference, is equally applicable without modification both to positively and negatively switched blower motor wiring schemes.

Figure 5:
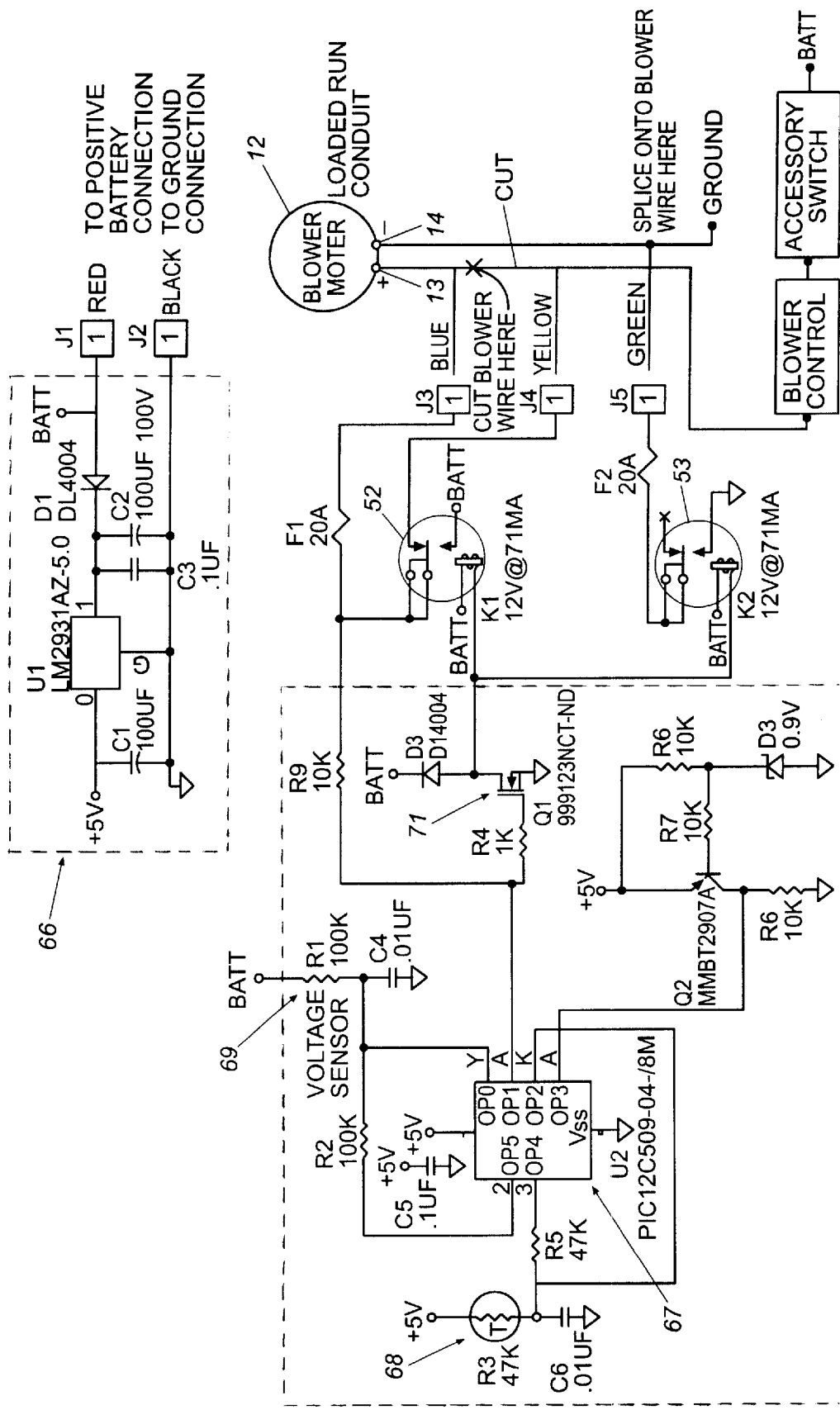
FIG. 5 is a detailed electronic schematic diagram of an EED circuitry of the present invention with a positively switched arrangement.
Figure 6:
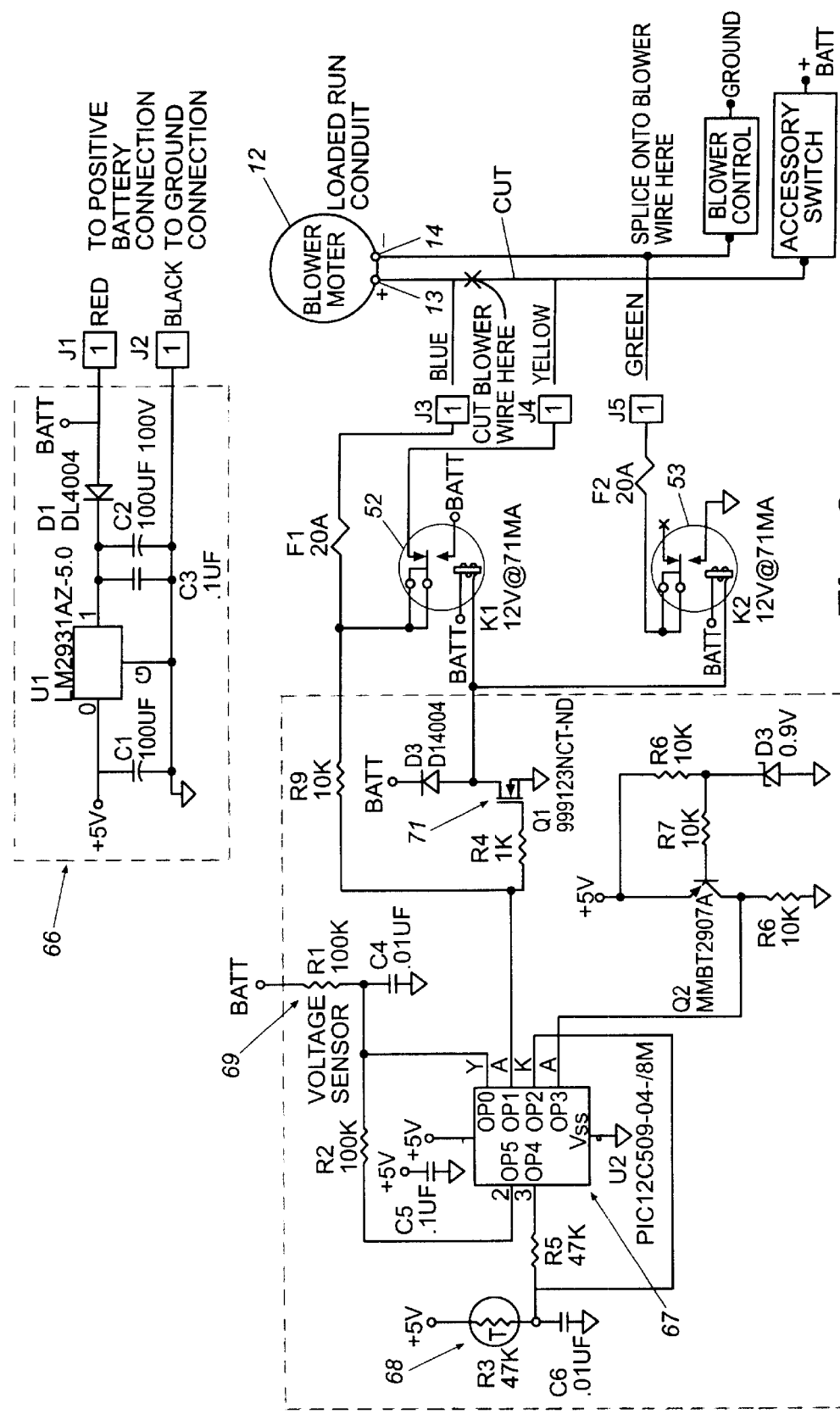
FIG. 6 is a detailed electronic schematic diagram of an EED circuitry of the present invention with a negatively switched arrangement.

FIGS. 5 and 6 are electronic schematic diagrams of circuits for carrying out the present invention in a positively switched arrangement and a negatively switched arrangement respectively. Many of the electronic components in these diagrams are the same as or functionally similar to those illustrated in the incorporated reference and therefore discussion in great detail is not required here. Generally, however, FIG. 5 illustrates a blower motor 12 having a positive terminal 13 and a negative terminal 14. The positive terminal 13 is connected to the blower control circuit, which, in turn is connected to the accessory switch and the positive terminal of the battery. The negative terminal 14 of the blower motor is connected to ground. FIG. 6 illustrates the invention within the context of a negatively switched arrangement, wherein the positive terminal 13 of the blower motor is connected to the accessory switch and the negative terminal of the blower motor is connected through the blower control circuit to ground. First and second relays 52 and 53 are illustrated in electronic schematic form in FIGS. 5 and 6, but will be seen to function as described with respect to FIGS. 3 and 4. More particularly, the first relay 52 is spliced in series with the wire connecting the positive terminal of the blower motor and the second relay 53 is shunted to the wire connecting the negative terminal of the blower motor.

The electronic components of the logic circuit 53 are illustrated enclosed in a dashed or phantom-lined box 63. Conditioned power to operate the electronic components of the logic circuit 63 is provided by a power supply and surge suppressor circuit 66, which is commonly understood by those of skill in the art.

The logic circuits 63 include a micro-controller chip 67, which, in the illustrated embodiment, is a PIC12C508-04-/SM chip. Such a micro-controller chip can be programmed with software to monitor various ones of its inputs and to control its outputs according to the condition of the inputs and the dictates of its programming. One of the inputs of the micro-controller 67 is connected to an ambient temperature sensor 68 and another input is connected to a battery voltage sensor 69, as described in some detail in the incorporated reference. One of the outputs of the micro-controller 67 is connected to a transistor switch circuit 71, which, in turn, is coupled to the coils of the first and second relays 52 and 53.

The micro-controller 67 is programmed essentially as described in the incorporated reference. In general, the ambient temperature sensor 68 is monitored by the micro-controller 67 to determine the ambient temperature. The voltage sensor 69 is monitored to determine the battery voltage, which typically falls below a predetermined threshold when the engine is shut off after operation. When a drop in the battery voltage indicates that the engine has been running but has been shut off and, at the same time, the ambient temperature is high enough such that the probability is good that the air conditioning system has been operating, the software in the micro-controller then sets its output to activate the transistor switch circuit 71 and, in turn, the relays 52 and 53. When this occurs, the blower motor is attached directly to the battery and ground as described above such that the blower motor operates at full speed so long as the relays 52 and 53 are activated.

After a relatively short period of operation, such as, for example, 10 seconds, the micro-controller 67 deactivates the relays 52 and 53, which shuts off the blower motor. The blower motor is left off for a predetermined time, such as, for example, 30 minutes. During this time, condensed moisture on interior surfaces within the air conditioning system evaporates and the air within the ductwork of the system becomes saturated with moisture. At this point, the micro-controller 67 again activates the relays to operate the blower motor for a relatively short period of time in order to draw the moisture-saturated air out of the interior of the air conditioning ductwork. This cycle is repeated over a period of, for example, two hours, at the end of which time all of the residual condensate on surfaces within the air conditioning system is evaporated and removed from the air conditioning ductwork. Accordingly, at the end of the predetermined time schedule, the evaporator and other interior surfaces within the air conditioning system are dried such that mildew, fungus, mold, and other microorganisms do not tend to grow there. As an ultimate result, odor within the vehicle is essentially eliminated for the life of the vehicle.

Figure 7:
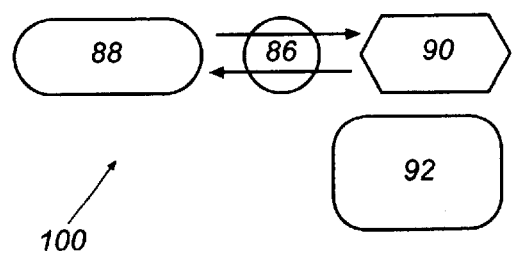
FIG. 7 is a diagrammatic representation of a vehicle air conditioning system encompassing aspects of the present invention.

As shown in FIG. 7, an air-conditioning system 100 of the present invention is provided. A compressor 88, an evaporator 90, and refrigerant 86 are shown in diagrammatic form to represent the general elements of an air-conditioning system. The refrigerant 86 is flowable through both the compressor 88, which compresses the refrigerant 86, and the evaporator 90, in which the refrigerant 86 absorbs heat. A blower 92 is also provided that cooperates with the evaporator 90 to provide air flow through the evaporator and into the vehicle to cool the passenger compartment thereof. The blower 92 may be controlled through either alternative blower control scheme described above and shown in FIGS. 3–6. The blower 92 may be activated when the engine is turned off, as described above, to remove condensate from the evaporator 90 and, possibly, other portions of the air-conditioning system 100 where it might develop. The result is a reduction in the propagation of odor-causing fungus and bacteria, thereby reducing odors originating in the air-conditioning system.

The invention has been described in terms of preferred embodiments and methodologies. It will be obvious to those of skill in the art, however, that various additions, deletions, and modifications to the preferred embodiments may be made, are within the spirit and scope of the invention.

What is claimed is:

1. An apparatus for operating the blower of an automotive air conditioning system on a predetermined timed schedule following operation of the air conditioning system to remove condensate from the interior of the air conditioning system and thus to thwart attendant odors, the blower having a positive terminal and a negative terminal, said apparatus comprising:

a first relay coupled to the positive terminal of the blower, said first relay, when activated, electrically connecting the positive terminal of the blower to the positive terminal of the automotive battery;

a second relay coupled to the negative terminal of the blower, said second relay, when activated, electrically connecting the negative terminal of the blower to ground; and a logic circuit operatively coupled to said first and second relays, said logic circuit being configured to activate said first relay and said second relay on a predetermined time schedule when the automotive air conditioning system is turned off after having been operated to remove moisture from within the air conditioning system and thereby to eliminate an atmosphere therein that is conducive to the growth of micro-organisms that cause undesirable odor.

2. The apparatus of claim 1, wherein said first relay includes a battery pole connected to the positive terminal of the automotive said battery.

3. The apparatus of claim 2, wherein said first relay includes an accessory switch pole connected to the positive terminal of the automotive battery through an accessory switch.

4. The apparatus of claim 3, wherein said accessory switch pole is connected to said accessory switch through a blower control circuit of the air-conditioning system.

5. The apparatus of claim 1, wherein said second relay includes an unconnected pole.

6. The apparatus of claim 5, wherein said second relay includes a ground pole.

7. The apparatus of claim 1, wherein said logic circuit is connected to a temperature sensor for determining ambient temperature.

8. The apparatus of claim 1, wherein said logic circuit is connected to a battery voltage sensor for monitoring battery voltage.

9. The apparatus of claim 1, wherein said negative terminal of said blower motor is connected to ground through a blower control circuit of the air-conditioning system.

10. An air conditioning system for a vehicle comprising:
a compressor coupled to an engine of the vehicle;
an evaporator in flow communication with said compressor;
a refrigerant flowable through said compressor and said evaporator;
a blower cooperating with said evaporator, said blower including a blower control and a blower motor having a positive terminal and a negative terminal; and,
a circuit bypassing said blower control and an accessory switch of the vehicle and connecting said positive terminal of said blower motor to a positive terminal of a battery of the vehicle and connecting said negative terminal of said blower motor to ground on a predetermined time schedule when the air conditioning system is turned off after having been operated.

11. The air-conditioning system of claim 10, wherein said circuit includes a logic circuit.

12. The air-conditioning system of claim 11, wherein said logic circuit is connected to a temperature sensor.

13. The air-conditioning system of claim 11, wherein said logic circuit is connected to a battery voltage sensor.

14. The air-conditioning system of claim 10, wherein said circuit includes a first relay and a second relay.

15. The air-conditioning system of claim 14, wherein said first relay includes a battery pole connected to said positive terminal of said battery.

16. The air conditioning system of claim 14, wherein said first relay includes an accessory switch pole connected to said positive terminal of said battery by an accessory switch.

17. The air-conditioning system of claim 16, wherein said accessory switch pole is connected to said accessory switch through said blower control.

18. The air-conditioning system of claim 14, wherein said second relay includes an unconnected pole.

19. The air-conditioning system of claim 14, wherein said second relay includes a ground pole.

20. The air-conditioning system of claim 14, wherein said negative terminal of said blower motor is connected to ground through said blower control.

21. The air-conditioning system of claim 14, wherein said first relay and said second relay are connected to a logic circuit.

22. The air-conditioning system of claim 21, wherein said logic circuit is connected to a temperature sensor.

23. The air-conditioning system of claim 21, wherein said logic circuit is connected to a battery voltage sensor.

24. An apparatus for use with an air conditioning system of a vehicle to dry condensate from the heat exchanger of the air conditioning system in order to prevent propagation of fungus and bacteria and resulting odors, said apparatus comprising:
a logic circuit connected to a battery voltage sensor and a temperature sensor;
a first relay connected to said logic circuit, to a positive terminal of a blower motor of the air conditioning system and through two connections to a positive terminal of a battery of the vehicle; and,
a second relay connected to said logic circuit, to a negative terminal of said blower motor, and through two connections to ground.

25. The apparatus of claim 24, wherein said two connections connecting said first relay to said positive terminal of said battery include a direct connection and an indirect connection through an accessory switch.

26. The apparatus of claim 25, wherein said indirect connection is also through a blower control.

27. The apparatus of claim 24, wherein said two connections connecting said second relay to ground include a direction connection to ground and an indirect connection to ground through a blower control.

28. A method of drying condensate from the heat exchanger of a vehicle's air conditioning system to thwart the propagation of fungus and bacteria and its attendant odor, said method comprising the steps of:
determining that the engine has been switched off;
sensing the ambient temperature and determining that the air conditioning system of the vehicle was in operation prior to the engine being switched off if the sensed ambient temperature is greater than a predetermined threshold;
operating the blower of the vehicle's air conditioning system on a predetermined time schedule to draw air through the air conditioning system for drying condensate from interior surfaces thereof, wherein operating the blower includes bypassing the blower control of the blower.

29. The method of claim 28, wherein operating the blower includes connecting the positive terminal of the blower motor directly to the positive terminal of the vehicle's battery and connecting the negative terminal of the blower motor directly to ground.

30. A method of drying condensate from within an vehicle's air conditioning system to thwart the propagation of fungus and bacteria and its attendant odor, the air conditioning system having a blower with a positive terminal and a negative terminal, said method comprising the steps of:
(a) determining that the engine of the vehicle has been shut off after having been operated;
(b) connecting the positive terminal of the blower directly to a positive voltage source from the vehicles battery and connecting the negative terminal of the blower directly to ground to operate the blower;

(c) after a predetermined time, disconnecting at least one of the terminals of the blower that was connected in step (b) to discontinue operation of the blower;

(d) repeating steps (b) and (c) for a predetermined number of cycles, the cycled operation of the blower drawing condensate from within the air conditioning system to thwart the propagation of fungus and bacteria therein.

31. The method of claim 30 and wherein step (c) comprises disconnecting the positive terminal of the blower from the source of positive voltage and disconnecting the negative terminal of the blower from ground.

32. The method of claim 30 and wherein step (a) comprises monitoring the voltage level of the vehicle's battery and determining that the engine has been shut off when the monitored voltage falls below a predetermined threshold after having been above the threshold.

33. The method of claim 30 and further comprising the step, in conjunction with step (a), of determining that the vehicle's air conditioning system was in operation prior to the engine being shut off before proceeding to step (b).

34. The method of claim 33 and wherein the step of determining that the vehicle's air condition system was in operation comprises sensing an ambient temperature and concluding that the air conditioning system was in operation if the sensed ambient temperature is above a predetermined threshold.

35. The method of claim 30 and wherein step (b) further includes disconnecting the positive terminal of the blower from its normal connection while it is connected directly to the positive voltage source and disconnecting the negative terminal of the blower from it normal connection while it is connected directly to ground.

36. The method of claim 35 and wherein the positive terminal's normal connection includes connection through a blower control circuit of the air conditioning system to a source of positive voltage from the vehicles battery.

37. The method of claim 35 and wherein the negative terminal's normal connection includes connection through a blower control circuit of the air conditioning system to ground.

* * * * *